Jan. 12, 1926.　　　　　　　　　　　　　　　　1,569,655
A. M. HUNT
LOCOMOTIVE STOKER MANGANESE STEEL UNIVERSAL JOINT
Filed Feb. 1, 1924

ANDREW M. HUNT
by
Charles Messick

Patented Jan. 12, 1926.

1,569,655

UNITED STATES PATENT OFFICE.

ANDREW M. HUNT, OF NEW YORK, N. Y., ASSIGNOR TO STANDARD STOKER COMPANY, INCORPORATED, OF WILMINGTON, DELAWARE, A CORPORATION OF DELAWARE.

LOCOMOTIVE-STOKER MANGANESE-STEEL UNIVERSAL JOINT.

Application filed February 1, 1924. Serial No. 689,937.

*To all whom it may concern:*

Be it known that I, ANDREW M. HUNT, a citizen of the United States, residing in the city of New York, county of New York, and State of New York, have invented a new and useful Improvement in Locomotive-Stoker Manganese-Steel Universal Joints, of which the following is a specification.

This invention relates to bearings and particularly to a bearing adapted for use in a universal joint, which bearing shall be simple, cheap, practical and of maximum resistance to wear, particularly when the lubrication of the bearing is neglected.

A specific object of my invention is to provide a universal joint for the driving mechanism in the type of locomotive stokers in which coal is conveyed forward from the bottom of the tender under the cab floor to the fire feeding device.

This type of stoker has important and well recognized advantages of convenience and avoids blocking the space used by the engineman and fireman, but because the conveyor apparatus is out of the way and somewhat inconvenient of access its lubrication is frequently neglected in the press of the other duties of the engineman and fireman. This neglect is particularly destructive to the universal joints of the drive shaft for the conveyor, which are designed to permit the locomotive and tender to have freedom of motion with relation to each other.

Dust and grit prevent any refined form of lubrication being practicable for these universal joints, and the limited space makes it necessary to keep the over-all dimensions small, so that rapid and destructive wear occurs from neglect of lubrication when such universal joints are made of ordinary materials. I find however that when the two bearing surfaces in contact with one another are formed of manganese steel, the universal joint operates satisfactorily and wears very little, even when its lubrication is neglected.

Manganese steel cannot be drilled or machined, except possibly at prohibitive cost by diamond tools, etc. It can be ground, but this is the only machining operation that can be practically performed on it.

Manganese steel can be purchased in the form of simple castings, but it is not at present available in forgings or other forms suitable for locomotive stoker universal joints.

Another specific object of my invention is therefore to design an improved and simplified form of universal joint for locomotive stokers which can be made of the available forms of manganese steel and such that the necessary grinding operations can be carried out readily, and such that the assembly of the joint can be made by bolting or riveting the parts together in proper engagement.

Other objects of my invention will appear from the following detailed description of the preferred construction and are pointed out in the claims.

Referring to the accompanying drawings.

Figure 1:
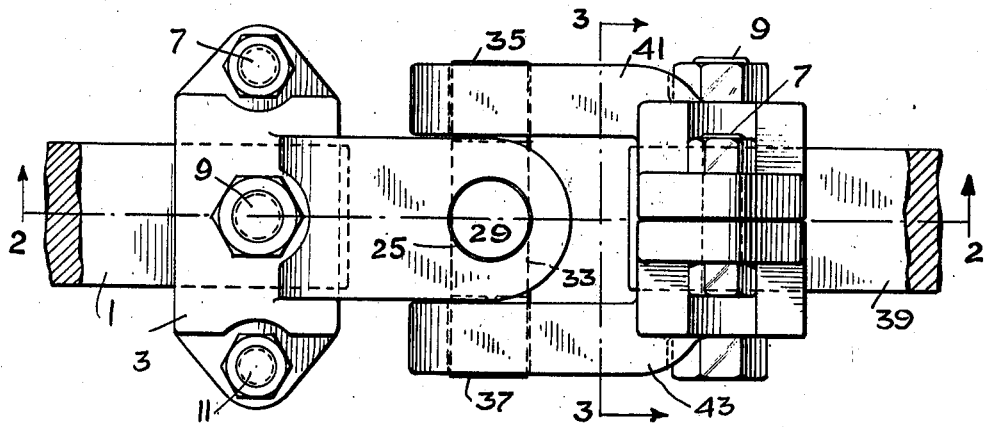
Fig. 1 is an elevation of my locomotive stoker manganese steel universal joint showing the whole device connecting two square shaft ends.
Figure 2:
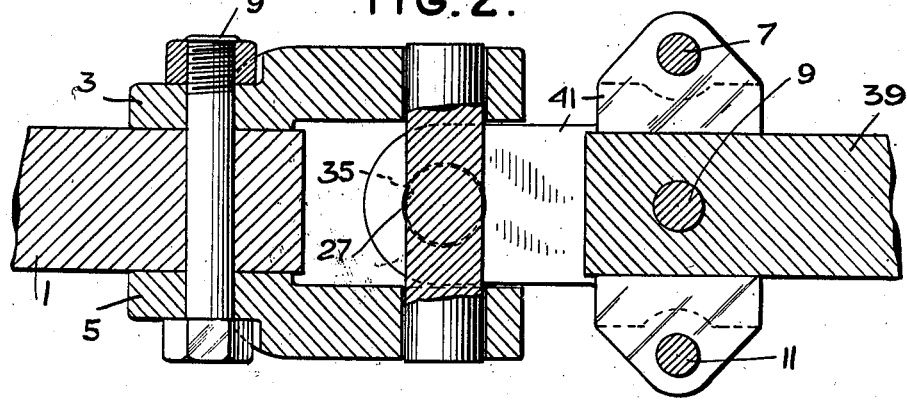
Fig. 2 is a section taken on the line 2—2 of Fig. 1.
Figure 3:
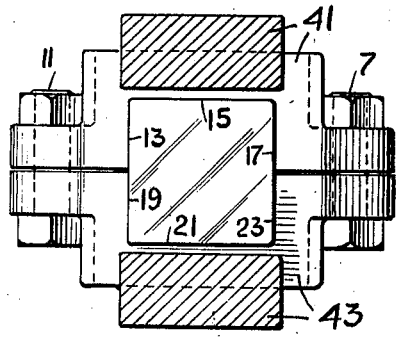
Fig. 3 is a section taken on the line 3—3 of Fig. 1.
Figure 4:
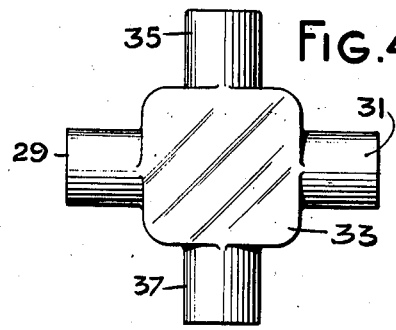
Fig. 4 is a side view of the pivot hub and its stub shafts which is one of the five manganese steel castings of my universal joint.

The numeral 1 indicates a square shaft of ordinary machine steel which may, for instance, be considered the driving shaft, and upon this shaft 1 is clamped a pair of manganese steel castings 3 and 5, the detailed shape of which is shown in Figs. 1 to 3.

These castings 3 and 5 are cast with cored bolt holes, through which bolts 7, 9 and 11 are inserted, tightened, and the threaded ends are peened over to prevent the nuts shaking off in service. It may be noted that the bolt 9 passes through shaft 1, while bolts 7 and 11 merely clamp castings 3 and 5 together.

Castings 3 and 5 are ground on the surfaces 13, 15, 17, and 19, 21, 23, as indicated in Fig. 3, the bolt holes having been cleaned out with a drift pin to a size as nearly accurate as possible before the bolts 7, 9 and 11 were inserted.

The large holes of castings 3 and 5, respectively indicated as 25 and 27, have both been cleaned out with a drift pin to receive the stub shafts 29 and 31. Stub shafts 29 and 31 are cast integral with and on opposite sides of the four sided pivot hub 33.

The pivot hub 33 is a manganese steel casting and the stub shafts 29, 31, and also the stub shafts 35 and 37 which are integral parts of this casting have been ground to cylindrical form. The stub shafts 29 and 31 were, of course, respectively inserted in the holes 25 and 27 before the bolts 7, 9 and 11 were secured in place.

The driven shaft 39 is provided with manganese steel castings 41 and 43, which are journaled, respectively, on stub shafts 35 and 37 and all the parts in Fig. 1, at the right of the pivot hub 33, are similar to those at the left, and previously described.

It will be noted that this design is especially arranged, so that no machining operations other than grinding are required, as the nature of manganese steel castings prevents their being finished by any practical machining operation except grinding.

Modifications of the design of this manganese steel universal joint may be made without departing from the spirit of my invention as long as the wearing parts are all of manganese steel.

I claim:

1. A universal joint having all articulating bearings made of manganese steel.

2. A universal joint adapted for use where lubrication is neglected, said joint having bearings of manganese steel and consisting of a pivot hub provided with four stub shafts, a pair of castings forming a fork secured to a driving shaft at one end of the pivot hub and another similar pair at the opposite end secured to a driven shaft.

3. In a locomotive having a cab and fire-feeding device and also provided with means for conveying coal under the cab floor from the tender to said fire-feeding device, a coupling construction comprising driving and driven shafts having squared ends, and universal joints connecting said shafts and so arranged as to permit the locomotive and tender to have freedom of movement with relation to each other, said universal joints comprising a pivot hub casting of manganese steel formed with four stub shafts, a pair of manganese steel castings embracing the squared end of a driven shaft and journalled on two of said stub shafts, and a second pair of manganese steel castings embracing the squared end of a driving shaft and journalled on the remaining two stub shafts.

ANDREW M. HUNT.